United States Patent
Carbune et al.

(10) Patent No.: US 11,651,196 B2
(45) Date of Patent: May 16, 2023

(54) REINFORCEMENT LEARNING TECHNIQUES FOR SELECTING A SOFTWARE POLICY NETWORK AND AUTONOMOUSLY CONTROLLING A CORRESPONDING SOFTWARE CLIENT BASED ON SELECTED POLICY NETWORK

(71) Applicant: Google LLC, Mountain View, CA (US)

(72) Inventors: Victor Carbune, Winterthur (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 536 days.

(21) Appl. No.: 16/617,949

(22) PCT Filed: Mar. 6, 2019

(86) PCT No.: PCT/US2019/020925
§ 371 (c)(1),
(2) Date: Nov. 27, 2019

(87) PCT Pub. No.: WO2020/176112
PCT Pub. Date: Sep. 3, 2020

(65) Prior Publication Data
US 2021/0334628 A1   Oct. 28, 2021

Related U.S. Application Data

(60) Provisional application No. 62/810,814, filed on Feb. 26, 2019.

(51) Int. Cl.
*G06N 3/04* (2006.01)
*G10L 15/22* (2006.01)
(Continued)

(52) U.S. Cl.
CPC ............. *G06N 3/0454* (2013.01); *G06N 3/00* (2013.01); *G06N 3/02* (2013.01); *G10L 15/00* (2013.01);
(Continued)

(58) Field of Classification Search
CPC .......... G06N 3/0454; G06N 3/00; G06N 3/02; G06N 3/0445; G06N 5/027; G06N 3/08;
(Continued)

(56) References Cited

U.S. PATENT DOCUMENTS

| 5,086,479 A | * | 2/1992 | Takenaga | ............. | G06N 3/0454 706/20 |
| 10,719,301 B1 | * | 7/2020 | Dasgupta | ............. | G06K 9/6267 |

(Continued)

OTHER PUBLICATIONS

European Patent Office; International Search Report and Written Opinion of Ser. No. PCT/US2019/020925; 16 pages; dated Nov. 7, 2019.
(Continued)

*Primary Examiner* — Thuykhanh Le
(74) *Attorney, Agent, or Firm* — Gray Ice Higdon

(57) ABSTRACT

Techniques are disclosed that enable automating user interface input by generating a sequence of actions to perform a task utilizing a multi-agent reinforcement learning framework. Various implementations process an intent associated with received user interface input using a holistic reinforcement policy network to select a software reinforcement learning policy network. The sequence of actions can be generated by processing the intent, as well as a sequence of software client state data, using the selected software reinforcement learning policy network. The sequence of actions are utilized to control the software client corresponding to the selected software reinforcement learning policy network.

18 Claims, 5 Drawing Sheets

(51) Int. Cl.
*G06N 3/00* (2006.01)
*G06N 3/02* (2006.01)
*G10L 15/20* (2006.01)
*G10L 15/00* (2013.01)

(52) U.S. Cl.
CPC .............. *G10L 15/20* (2013.01); *G10L 15/22* (2013.01); *G10L 15/222* (2013.01); *G10L 2015/223* (2013.01)

(58) Field of Classification Search
CPC ......... G10L 15/00; G10L 15/20; G10L 15/22; G10L 15/222; G10L 2015/223; G06F 2209/482; G06F 9/4843
USPC ............................................................ 706/25
See application file for complete search history.

(56) References Cited

U.S. PATENT DOCUMENTS

| | | | | |
|---|---|---|---|---|
| 11,037,029 | B2* | 6/2021 | Jiang | G06N 3/0454 |
| 11,048,978 | B2* | 6/2021 | Rabinovich | G06N 3/0454 |
| 11,087,201 | B2* | 8/2021 | Hua | G06N 3/063 |
| 11,107,001 | B1* | 8/2021 | Bertram | G06N 3/08 |
| 11,210,585 | B1* | 12/2021 | Heess | G06N 3/088 |
| 2009/0112602 | A1* | 4/2009 | Alfred | H04L 12/2818 704/E17.001 |
| 2016/0063992 | A1* | 3/2016 | Selfridge | G10L 15/22 704/254 |
| 2016/0379112 | A1* | 12/2016 | He | G06N 3/0454 706/25 |
| 2017/0140271 | A1* | 5/2017 | Reed | G06N 3/0445 |
| 2017/0269975 | A1 | 9/2017 | Wood et al. | |
| 2018/0173403 | A1 | 6/2018 | Carbune et al. | |
| 2018/0182390 | A1* | 6/2018 | Hughes | G10L 15/02 |
| 2018/0196683 | A1* | 7/2018 | Radebaugh | G06F 9/453 |
| 2019/0019112 | A1 | 1/2019 | Gelfenbeyn et al. | |
| 2019/0236438 | A1* | 8/2019 | Odena | G06N 3/006 |
| 2019/0378052 | A1* | 12/2019 | Badhwar | G06N 20/00 |
| 2020/0027210 | A1* | 1/2020 | Haemel | G06F 9/5038 |
| 2020/0066270 | A1* | 2/2020 | Lee | G06N 20/00 |
| 2020/0184307 | A1* | 6/2020 | Lipka | G06N 3/0472 |
| 2020/0193094 | A1* | 6/2020 | Topol | G06F 40/30 |
| 2020/0194103 | A1* | 6/2020 | Weldemariam | G16H 10/60 |
| 2020/0234110 | A1* | 7/2020 | Singh | G06F 21/57 |
| 2020/0244707 | A1* | 7/2020 | Silver | G06N 3/0454 |
| 2020/0265315 | A1* | 8/2020 | Zoph | G06N 3/0445 |
| 2020/0293899 | A1* | 9/2020 | Fernando | G06N 3/0454 |
| 2020/0382451 | A1* | 12/2020 | Ogawa | G06F 3/015 |
| 2021/0004676 | A1* | 1/2021 | Jaderberg | G06N 3/0481 |
| 2021/0064967 | A1* | 3/2021 | Nosko | G06N 3/08 |
| 2021/0110115 | A1* | 4/2021 | Hermann | G06F 40/30 |
| 2021/0117786 | A1* | 4/2021 | Schwarz | G06N 3/084 |
| 2021/0124422 | A1* | 4/2021 | Forsland | G10L 15/22 |
| 2021/0201156 | A1* | 7/2021 | Hafner | G06N 3/084 |
| 2021/0201526 | A1* | 7/2021 | Moloney | G06N 3/0454 |
| 2021/0271968 | A1* | 9/2021 | Ganin | G06N 3/0445 |
| 2021/0312725 | A1* | 10/2021 | Milton | G06N 3/0454 |
| 2021/0339389 | A1* | 11/2021 | Arcand | G06N 5/046 |
| 2021/0342669 | A1* | 11/2021 | Godwin, IV | G06N 3/08 |
| 2022/0007084 | A1* | 1/2022 | Aytekin | H04L 65/75 |
| 2022/0092416 | A1* | 3/2022 | Houlsby | G06N 3/084 |
| 2022/0121934 | A1* | 4/2022 | Duan | G06N 3/08 |

OTHER PUBLICATIONS

Yang, E. et al. "Multiagent Reinforcement Learning for Multi-Robot Systems: A Survey;" retrieved from internet: https://pdfs.semanticscholar.org/1830/13b85235f2f84abd606e8527160a1d915190.pdf; 23 pages; 2004.

Vinyals, O. et al. "Pointer Networks;" Cornell University; www.arXiv.org, arXiv: 1506.03134v2; 9 pages; Jan. 2, 2017.

Peng, P. et al. "Multiagent Bidirectionally-Coordinated Nets, Emergence of Human-level Coordination in Learning to Play StarCraft Combat Games;" Cornell University; www.arXiv.org, arXiv: 1703.10069v4; 10 pages; Sep. 14, 2017.

Rashid, T. et al. "QMIX: Monotonic Value Function Factorisation for Deep Multi-Agent Reinforcement Learning;" Cornell University; www.xrXiv.org, arXiv:1803.11485v2; 14 pages; Jun. 6, 2018.

Foerster, J. et al. "Counterfactual Multi-Agent Policy Gradients;" Thirty-Second AAAI Conference on Artificial Intellingence; 9 pages; Apr. 29, 2018.

Tampuu, A. et al. "Multiagent Cooperation and Competition with Deep Reinforcement Learning;" Cornell University; www.arXiv.org, arXiv: 1511.08779v1; 12 pages; Nov. 27, 2015.

European Patent Office; Examination Report issued in Application No. 19712871.3-1203; 12 paages; dated Mar. 29, 2023.

* cited by examiner

REINFORCEMENT LEARNING TECHNIQUES FOR SELECTING A SOFTWARE POLICY NETWORK AND AUTONOMOUSLY CONTROLLING A CORRESPONDING SOFTWARE CLIENT BASED ON SELECTED POLICY NETWORK

BACKGROUND

Many users repeat certain tasks on a client device (e.g., a smart phone), such as ordering a pizza, requesting a taxi/car service, downloading statements, controlling smart device (s), etc. For each of these tasks, the user repeats a corresponding sequence of actions when the user performs the task. A client device can additionally include an automated assistant (also known as a "personal assistant", "mobile assistant", etc.) which may be interacted with by a user. A client device can include a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device, and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

SUMMARY

Implementations described herein are directed to holistic multi-agent reinforcement learning techniques that are utilized to: (a) select software policy network(s) for performing a task specified by received user input, and to (b) generate, utilizing the selected software policy network(s), a sequence of actions for controlling corresponding software client(s) to automatically (i.e., without further user input) complete the task. Various implementations can reduce the quantity of user inputs required to accomplish the task since, for example, appropriate software policy network(s) can be automatically selected and/or the sequence of actions can be generated automatically utilizing the selected software policy network(s) and one or more (e.g., all) actions of the sequence can be performed automatically to control the corresponding software client(s) and complete the task. Accordingly, consumption of various client device resources are reduced such as resources that would otherwise be required to prompt the user for selection of an appropriate software client, to render content from the software client and await user input to control the software client, and/or to process such user input. Additionally, the quantity of user inputs can be reduced to accomplish a particular task, which can be advantageous to users with limited dexterity and/or other users. Moreover, various implementations automatically select and/or control software clients based on a received user input, thereby automatically guiding human/ assistant interactions in the performance of a technical task specified by the user input.

A user can perform a variety of tasks (i.e., perform a sequence of actions to complete a task) at a client device using a variety of software applications. For example, a sequence of actions applied at a music application can be utilized to cause the music application to play music via the client device, a sequence of actions applied to a restaurant application can cause the restaurant application to order a pizza, a sequence of actions applied to a lighting control application can cause the lighting control application to control one or more smart lights, etc. Implementations disclosed herein present a holistic reinforcement learning framework that is utilized to select an appropriate software policy network for resolving an intent specified by user input, and to control a corresponding software client utilizing to resolve the intent. In many implementations, the holistic reinforcement learning framework can effectively extend automated assistant functionality to the variety of software applications of the client device.

In general, the goal in reinforcement learning is to control an agent attempting to maximize a reward function which, in the context of a client device task, denotes a user provided definition of what the client device should try to accomplish. Reinforcement learning finds the optimal policy which maximizes the expected sum of rewards from an initial state distribution. The reward is based on the reward function which is dependent on the task to be accomplished. Accordingly, reinforcement learning seeks to learn an optimal policy for performance of a given task.

A holistic reinforcement learning framework is a multi-agent framework and includes a holistic agent (and corresponding holistic policy network model) as well as one or more software client agents (each with a corresponding software policy neural network), where each software application agent corresponds with a particular software application of the client device. For example, a user can provide natural language spoken input of "play rock music" to a client device, and the holistic policy network can be used to select a software policy network corresponding with the intent of the spoken input. For example, a holistic agent can utilize to the holistic policy network to select the software policy network corresponding with a hypothetical music client, where the hypothetical music client can play music. The software policy network corresponding with hypothetical music client can then be used (e.g., by a corresponding agent) in generating and applying (to the hypothetical music client) a sequence of actions to "play rock music".

An intent corresponding to user interface input can be determined using an additional component of the client device and/or of a remote device in communication with the client device (such as a natural language understanding (NLU) engine of an automated assistant). The determined intent can be processed using a policy network model of the holistic reinforcement learning agent (i.e., the holistic policy neural network). In many implementations, the policy network model can be a neural network such as a feed-forward neural network, a convolutional neural network, a recurrent neural network, a sequence to sequence network, a pointer network, and/or additional types of neural network models.

Similarly, each software client can have a corresponding software policy network model which can process the intent, a sequence of state data, one or more portions of the user interface input, and/or additional information to generate a sequence of actions to complete the task. The sequence of actions can be applied, in sequence, to the software client to complete the task. It is noted that the sequence of state data (used in generating the sequence of actions) is based on corresponding states of the software client, which are influenced by already applied actions of the sequence of actions.

In a variety of implementations, user interface input can include a portion corresponding to an intent as well as an additional portion correspond to an additional intent. For example, user interface input can include "turn off the lights and turn down the air conditioning" or "turn off the lights and order a large cheese pizza". In some such implementations, a holistic policy network can process the intent associated with the first portion (e.g., the intent corresponding with turn off the lights) to select a software policy network associated with a first software client used in turning off the lights. Similarly, the holistic policy network can process the intent associated with the second portion (e.g., the intent corresponding with turn down the air conditioning or the intent corresponding with order a large cheese pizza) to select an additional software policy network associated with a second software client used in controlling the air conditioning system or in ordering pizza. Each selected software policy neural network can be utilized in generating a corresponding sequence of actions to complete the corresponding task. For example, the first software policy neural network will be used in generated a first sequence of actions to control the first software client and the second software policy neural network will be used in generating a second sequence of actions to control the second software client.

If a software policy network cannot be selected using a holistic policy network, the system can prompt the user to provide the software client associated with completing the task, and the software client can be used to update one or more parameters (such as one or more weights) in the holistic policy network. Additionally or alternatively, the system can prompt the user for an entire sequence of actions to perform the task, and can update one or more parameters of the holistic policy network using a portion of the sequence of actions (e.g., an action where the user selects the appropriate software client). Furthermore, the sequence of actions can be used as a training episode to update one or more parameters (such as one or more weights) of a corresponding software policy network. Similarly, if a software policy network cannot generate a sequence of actions (despite the correct software policy network being selected using the holistic policy network), the system can prompt the user for the sequence of actions to use as a training episode for updating one or more parameters in the software policy network.

In many implementations, one or more weights in the holistic policy network and/or one or more weights in a selected software policy network can be updated based on reward signal(s). For example, a reward signal for a holistic policy network can indicate the success of selecting the particular software application policy network. The holistic reward signal can be based on content generated by the selected particular software client, further action(s) performed by the user (e.g., user actions subsequent to the client device rendering output), and/or additional reward signals. For example, a user can provide natural language input of "turn on the kitchen light". If, after the client device renders output, the user repeats the request "turn off the kitchen light", a negative reward signal can be determined indicating the light was not turned off. Similarly, if, after the client device renders output, the user provides additional user interface input with an intent different than the previous user interface input, a positive reward signal can be determined indicating the task was completed. In other words, a user providing an additional task provides an indication the previous task was successfully completed. Additionally or alternatively, a message such as a confirmation message (or lack thereof when a confirmation message is expected) can provide a reward signal indicating a task was successfully completed (or unsuccessfully completed if a confirmation message is missing, if the confirmation message indicates an alternatively task was completed, etc.). For example, a confirmation message of "Your order of three pizzas has been placed" subsequent to user interface input of "please order me three cheese pizzas" can provide a positive reward signal that the task of ordering pizza is complete. Conversely, a confirmation message of "Your order of three brownies has been placed" subsequent to user interface input of "please order me three cheese pizzas" can provide a negative reward signal that the task of ordering pizza was not successfully completed. Furthermore, a client device can prompt a user to provide a reward signal subsequent to performing one or more actions (e.g., prompt a user to provide a spoken response indicating whether the task was successfully completed or not).

In many implementations, a trained holistic policy network and/or trained software policy network(s) can be transmitted to a client device from a server that is remote from the client device. In some such implementations, the trained holistic policy network and/or trained software policy network(s) can be further trained and refined for a user of the client device based on sequences of actions of the user of the client device.

Various implementations disclosed herein set forth techniques for automating the performance of technical tasks corresponding to received user interface input, for example in order to control a technical system. By automating a task using a holistic policy network as well as a software policy network, the user interface input required to perform the task is reduced. For example, user interface input of "decrease the temperature by three degrees" corresponds with the technical task of adjusting the temperature on a smart thermostat. A sequence of actions for a user to perform this task can include: navigating to a software client corresponding to the smart thermostat; opening the software client corresponding to the smart thermostat; selecting the thermostat; decreasing the temperature by one degree; decreasing the temperature by an additional degree; decreasing the temperature by an additional degree. Automating this task reduces the inputs by replacing the sequence of user actions with a single instance of user input (i.e., spoken input of "decrease the temperature by three degrees"). Reducing the inputs required to complete a task can conserve resources including battery power, processor cycles and/or memory consumption (e.g., a client device is not required to render output corresponding to each state of a software client, which may reduce overall screen-on time, the client device receives less user interface input, and thus may not need to process so many user inputs, etc.).

Various implementations disclosed herein reduce the action space corresponding with software policy networks at one or more iterations of utilizing the software policy networks in generating an action in a sequence of actions. For example, not every action of a software client is available at every state of the software client. For instance, the initial starting screen of a software client can have available actions A, B, C, and D, whereas another screen of the software client can have available actions C, D, and E. Available actions at a current state can be determined utilizing one or more of various techniques. For example, available actions be determined using an accessibility application programming interface (API), based on analysis of rendered content (e.g., graphical buttons, text entry fields, etc.), and/or an API provided by the software client. The action space of a software policy network can be reduced, using the available actions at a current state, in a variety of ways including by masking actions that are not current available actions, by only providing available actions to software policy network models that can utilize variable length inputs and variable length outputs (e.g., pointer networks), etc. This reduction of the action space allows policy neural network models to be trained more efficiently and/or to run more efficiently, which provides further conservation of client device resources such as battery power, processor cycles, memory usage, and/or additional client device resources.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
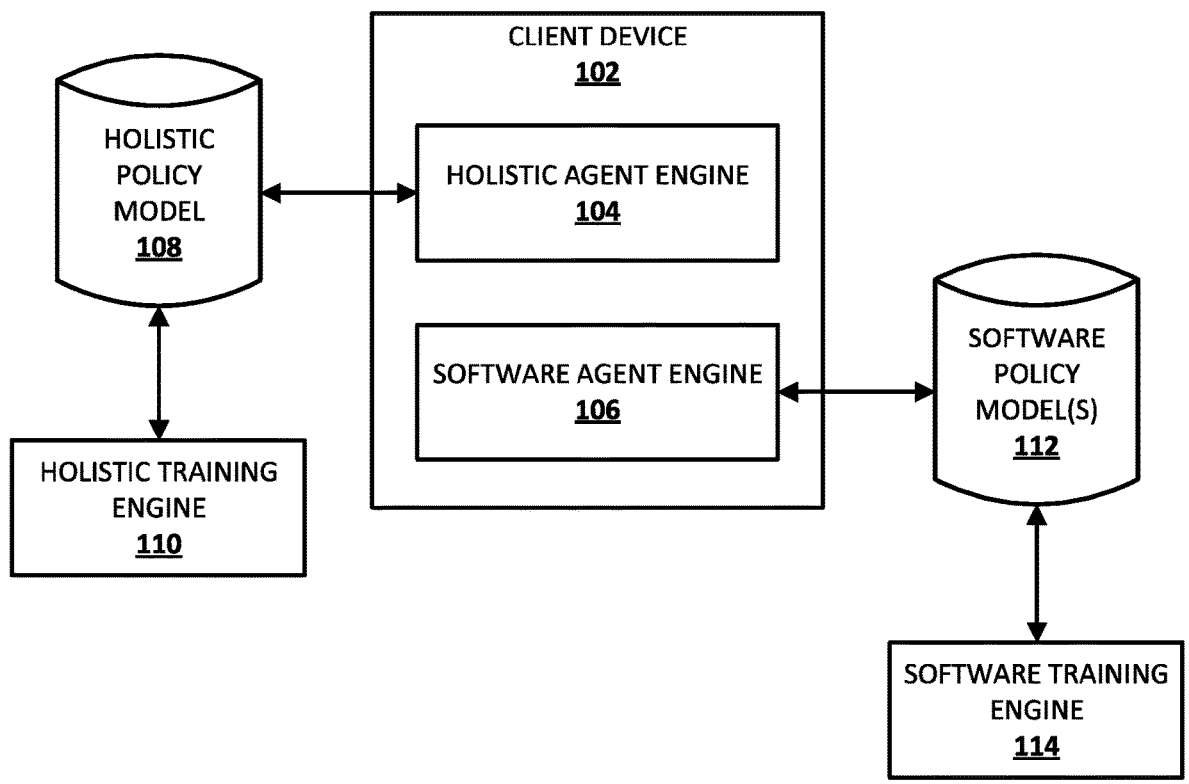
FIG. 1 illustrates a block diagram of an example environment in which various implementations disclosed herein can be implemented.

Turning to FIG. 1, an example environment is illustrated in which various implementations disclosed herein can be performed. FIG. 1 includes a client computing device 102, holistic agent engine 104, software agent engine 106, holistic training engine 110, and software training engine 114. The client device 104 may be, for example, a standalone voice activated speaker device, a desktop computing device, a laptop computing device, a smart phone computing device, a computing device of a vehicle of the user (e.g., an in-vehicle communications system, an in-vehicle entertainment system, an in-vehicle navigation system), and/or a wearable apparatus of the user that includes a computing device (e.g., a watch having a computing device, glasses having a computing device, a virtual or augmented reality computing device, etc.). Additional and/or alternative client devices may be provided.

Holistic agent engine 104, software agent engine 106, holistic training engine 110, and software training engine 114 are example components in which techniques described herein may be implemented and/or with which systems, components, and techniques described herein may interface.

The operations performed by one or more engines 104, 106, 110, and/or 114 may be distributed across multiple computing systems. In some implementations, one or more aspects of engines 104, 106, 110, and/or 114 may be combined in a single system and/or one or more aspects may be implemented on client device 102. For example, in some of those implementations, aspects of holistic agent engine 104 may be combined with aspects of holistic training engine 110. Engines in accordance with many implementations may each be implemented in one or more computing devices that communicate, for example, through a communications network. A communication network may include a wide area network such as the Internet, one or more local area networks (LANs) such as Wi-Fi LANs, mesh networks, etc., and/or one or more bus subsystems. A communication network may optionally utilize one or more standard communication technologies, protocols, and/or inter-process communication techniques.

In many implementations, client device 102, using holistic training engine 110, can train holistic policy model 108. For example, holistic training engine 110 can train one or more parameters of holistic policy model 108 based on a sequence of user actions (such as a user selecting a software client on the client device and then performing action(s) using the software client). Additionally or alternatively, holistic training engine 110 can update one or more parameters of holistic policy model 108 using a reward signal. A reward signal can be generated using holistic training engine 110, holistic agent engine 104, one or more additional engines of client device 102, etc. For example, the reward signal can be based on content generated by a particular software client associated with a software policy model selected using the holistic policy model. Additionally or alternatively, the reward signal can be based on one or more further actions performed by the user subsequent to the client device rendering output. A negative reward signal can be associated with a user repeating the same user interface input subsequent to the client device rendering output. For example, a user providing user input of "turn off the light" subsequent to the client device rendering output based on user input of "turn off the light" can indicate the client device did not turn on the light. Similarly, a positive reward signal can be associated with a user providing different user interface input in response to the client device rendering output. For example, a user can provide interface input of "play rock music" subsequent to the client device rendering output based on user interface input of "turn off the light" can indicate the client device did turn on the light.

Additionally or alternatively, client device 102, using software training engine 114, can train software policy model(s) 112. For example, software training engine 114 can train one or more parameters of one or more software policy model(s) 112 based on a sequence of user actions (such as a user selecting a software client on the client device and then performing action(s) using the software client). Additionally or alternatively, software training engine 114 can update one or more parameters of software policy model(s) 112 using a reward signal. In some implementations, a reward signal used in updating software policy model(s) 112 can be the same reward signal used in updating the holistic policy model 108 utilized in selecting a particular software policy model 112. In some other implementations, a reward signal used in updating software policy model 112 is a distinct reward signal than the one used in updating holistic policy model 108. A reward signal can be generated using software training engine 114, software agent engine 106, one or more additional engines of client device 102, etc.

Holistic agent engine 104, using holistic policy model 108, can process an intent (associated with received user interface input) to select a particular software policy model 112. The intent can be generated, for example, by an NLU engine (e.g., natural language processor 416 of FIG. 4). In some implementations, holistic agent engine 104 can additionally process one or more values for one or more slots that are associated with the intent, and also associated with the user input. For example, for user input of "dim the kitchen lights", the holistic agent 104 can process, using the holistic policy model 108, an intent associated with "dimming" and/or a value corresponding to "kitchen lights". Accordingly, the holistic agent engine 104 can process the intent and/or value(s) associated with the intent, using the holistic policy model 108, in selecting a particular software policy model 112. Furthermore, software agent engine 106, using the particular software policy model 112, can generate a sequence of actions using the intent, a sequence of client device state data, and/or additional inputs. In some implementations, the software agent engine 106 can additionally process value(s) for slots that are associated with the intent, using the particular software policy model 112, in generating the sequence of actions.

Figure 2:
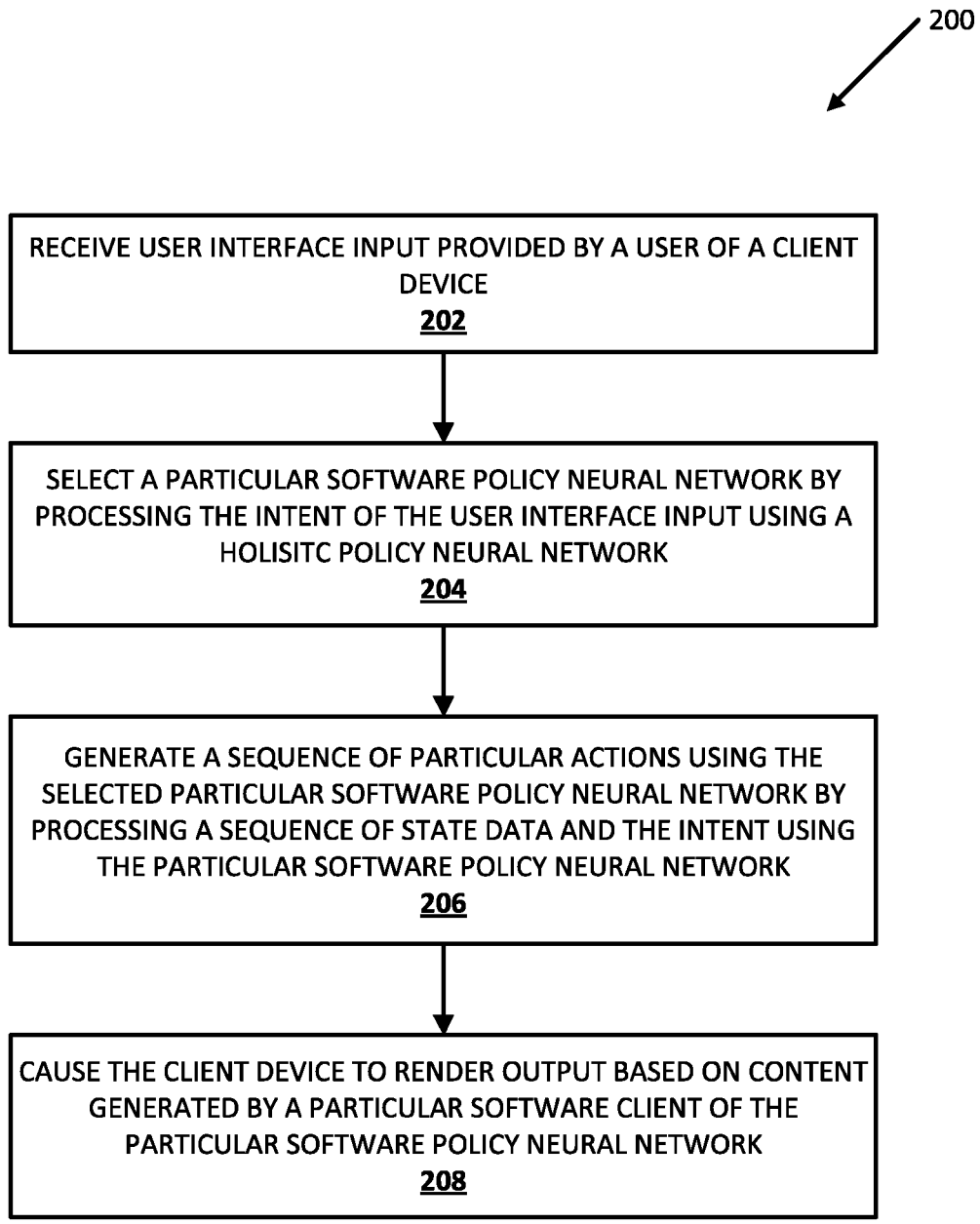
FIG. 2 is a flowchart illustrating an example process of selecting a software policy neural network using a holistic policy neural network and generating a sequence of actions using the software policy neural network.

FIG. 2 is a flowchart illustrating an example process 200 of generating a sequence of actions using a software policy network selected using a holistic policy network. For convenience, the operations of the flowchart are described with reference to a system that performs the operations. This system may include one or more components of a client device such as a processor. Moreover, while operations of process 200 are shown in a particular order, this is not meant to be limiting. One or more operations may be reordered, omitted, and/or added.

At block 202, the system receives user interface input provided by a user of a client device. For example, the system can receive spoken input captured by one or more microphones of the client device, gesture input captured by one or more cameras of the client device, typed input provided via one or more virtual keyboards of the client device, and/or other user interface input.

At block 204, the system selects a particular software policy neural network by processing an intent corresponding to the user interface input using a holistic policy neural network. As described herein, the intent can be generated by a separate component, such as a natural language processor that processes text included in the user interface input or generated based on the user interface input (e.g., using a speech-to-text processor). In many implementations, selecting a particular software policy network can cause the corresponding software client to be opened. In a variety of implementations, the particular software policy neural network is selected from a group of software policy neural networks, each network corresponding to a distinct software client of the client device. For example, a client device can include 'hypothetical music client', 'hypothetical pizza client', and 'smart light client'. A first software policy neural network can be associated with 'hypothetical music client', a second software policy neural network can be associated with 'hypothetical pizza client', and a third software policy neural network can be associated with 'smart light client'. In response to the client device receiving user interface input of "order a large cheese pizza", holistic software policy neural network can select the second software policy neural network associated with 'hypothetical pizza client' which corresponds with the intent of ordering pizza.

In many implementations, a client device can include several software clients for fulfilling a specific user intent. For example, the client device can include 'hypothetical music client' as well as 'additional music client', each with a corresponding software policy neural network. One or more of the software clients can be, for example, a corresponding application that is installed on the client device. In a variety of implementations, the system can randomly (or pseudorandomly) selects a software policy network when it determines, using the holistic policy network, that multiple software policy networks can be selected. For example, the system can select the software policy network corresponding with 'hypothetical music client' subsequent to receiving a first intent of playing music, and can select the software policy network corresponding with 'additional music client' subsequent to receiving a second intent of playing music.

Furthermore, in many implementations, user interface input can include multiple intents. For example, user interface input of "order a large cheese pizza and play party music" includes a first intent associated with ordering pizza and a second intent of playing music. The holistic policy neural network can process the first intent (i.e., the intent associated with ordering a large cheese pizza) to select a first software policy neural network, and the holistic policy neural network can process the second intent (i.e., the intent associated with playing party music) to select a second software policy neural network.

If, at block 204, the system is unable to select the particular software policy network using the holistic policy network, the system can prompt the user to perform the sequence of actions on the client device, and can use the sequence of actions as a training instance to update one or more parameters of the holistic policy network and/or the software policy network corresponding to the software client selected by the user. For example, the user can provide user interface input of "increase the temperature by five degrees". If the system is unable to select a software policy network by processing an intent of adjusting the thermostat using the holistic policy network, the system can provide responsive to the content to the user of "unable to process your request, please manually increase the temperature so we can learn how to in the future" to prompt the user to provide a training instance related to adjusting the temperature.

At block 206, the system generates a sequence of particular actions using the selected particular software policy neural network by processing a sequence of state data and the intent using the particular software policy neural network. The sequence of state data is based on states of the particular software client during controlling of the particular software client based on the sequence of particular actions. For example, a sequence of actions to turn on a light can include: opening the software client for turning on the light; selecting the room corresponding with the desired light; selecting the desired light; turning on the desired light. After each action, the state of the software client changes. For example, the software client can begin on a 'home' screen. After performing an action on the home screen, the state of the software client can change to an alternative screen.

In many implementations, the current state of the software client and the intent can be processed using the selected software policy network to generate a first action. After the client device performs the first action, the state of the software client changes to a second state of the software client, and the second state of the client device and the intent are processed using the selected software policy network to generate a second action. This can continue until the sequence of actions is generated (and performed) to complete the intent.

In a variety of implementations, a software policy neural network can be associated with an action space of the software client. For example, the action space can include all possible actions the software client can perform (and/or all possible actions that are performable via the client device), and the sequence of actions is generated based on actions in the action space. Some actions can be available at any state of the software client. For example, an action to close the software client may be available throughout the states of a software client. However, many actions will not be available at every state of the client device. For example, a software client can be used to order food from Hypothetical Café and can include an action for populating payment information for the selected order. This action is not available until food to order has been selected (i.e., is not available at every state of the client device). In a variety of implementations, the system can determine one or more actions available at a state, and can process the available actions in generating the sequence of particular actions. For example, accessibility APIs can be utilized in determining available actions at a current state. Additionally or alternatively, available actions can be determined based on analysis of rendered content of the software client such as graphical buttons, text entry fields, etc. Furthermore, available actions can include an emulation of a human touch to interact with a software client, such as selecting a particular button, scrolling up, scrolling down, swiping left, swiping right, entering text into a text field, etc. For example, a software client can include four selectable buttons, where action 1 corresponds to selecting button 1, action 2 corresponds to selecting button 2, action 3 corresponds to selecting button 3, and action 4 corresponds to selecting button 4.

In many implementations, the portions of the action space not corresponding to the available actions can be masked out. For example, an action space can include: action 1, action 2, action 3, and action 4. The system can determine action 1 and action 3 are available for the current state, and can mask out action 2 and action 4. For example, the probability of the action 2 and action 4 can be set to zero, thus ensuring the generated action in the sequence of actions generated using the software policy network will not include action 2 and/or action 4.

In many implementations, the software policy neural network can process variable length inputs to generate variable length outputs. For example, a pointer network can process a variable length input and generates a variable length output that "points" (e.g., using a pointer data structure) to the inputs. In a variety of implementations, the available actions (as well as the state data and the intent) can be processed using a pointer network to determine a variable length output used to generate an action. By not processing unavailable actions, the pointer network can increase computational efficiency during processing using the software policy neural network. Moreover, during training the pointer network can be trained more efficiently as a result of not processing unavailable actions, enabling the policy network to converge toward an optimal policy more quickly. As a further example, at a first state the action space can be reduced to action 1 and action 2; at a second state the action space can be reduced to action 2, action 3, and action 4; at a third state the action space can be again reduced to action 1 and action 2. In other words, the action space can dynamically change within a single software agent as the state of the software client changes.

If, at block 206, the system is unable to generate the sequence of actions using the selected software policy network, the system can prompt the user to perform the request and use the sequence of actions generated by the user as an additional training instance for the holistic policy network and/or the selected policy network. For example, the system may have selected an incorrect software policy network using the holistic policy network, and the training instance can be used in updating one or more parameters of the holistic policy network. Additionally or alternatively, the holistic policy network can select a correct particular software policy network, but the system cannot generate the sequence of actions using the correct software policy network. In this case, the training instance can be used in updating one or more parameters in the correct software policy network.

At block 208, the system causes the client device to render output based on content generated by a particular software client corresponding to the particular software policy neural network. For example, a user can provide input of "turn off the kitchen lights", and the system can provide a spoken response of "ok, turning off the kitchen lights" in addition to turning off the lights. Similarly, a user can provide input of "order my morning coffee", and the system can provide a visual response (i.e., text) of "OK, your coffee has been ordered".

Figure 3:
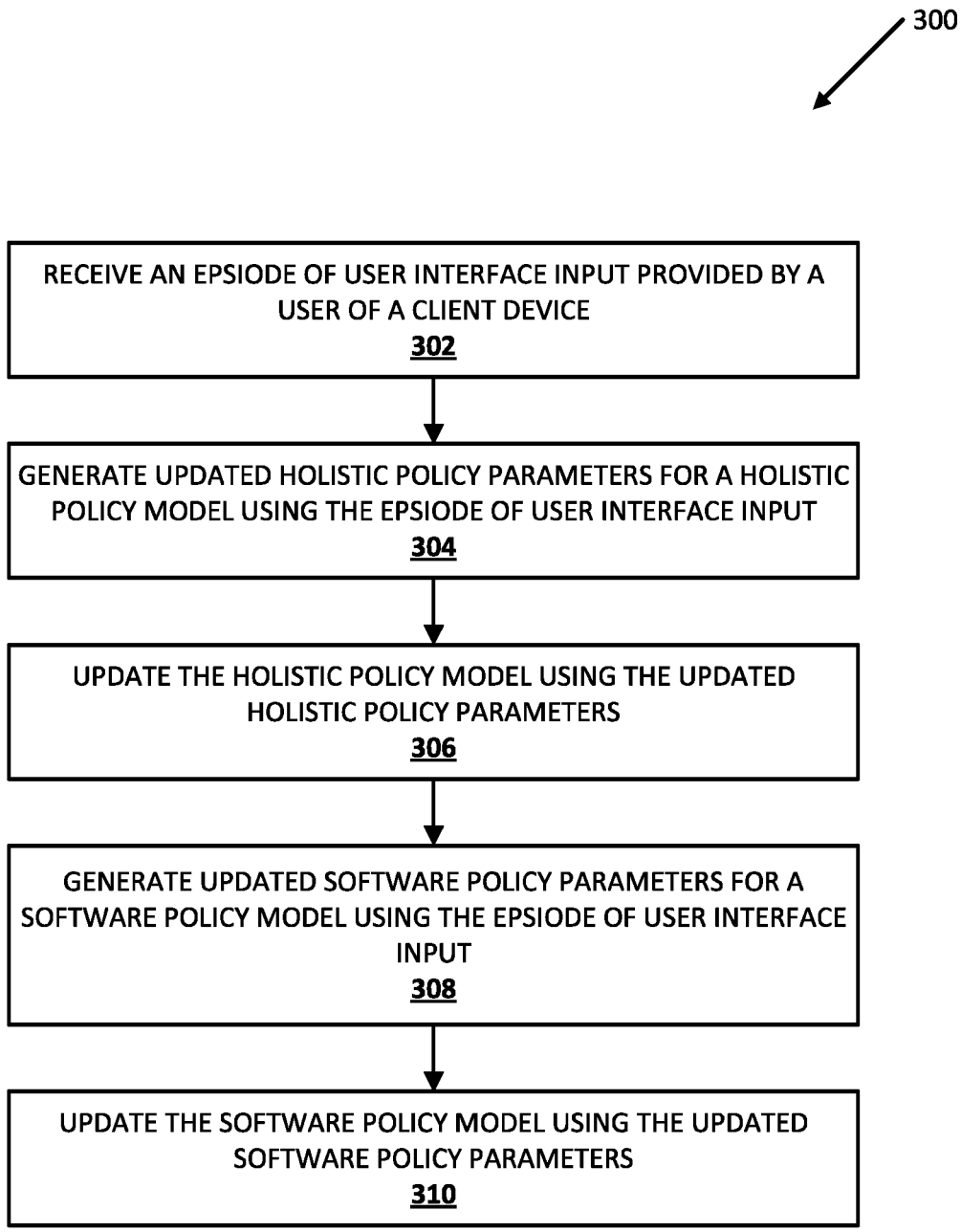
FIG. 3 is a flowchart illustrating an example process of training a holistic reinforcement learning framework according to various implementations disclosed herein.

FIG. 3 is a flowchart illustrating an example process 300 of training a holistic reinforcement learning framework. For convenience, the operations of the flowchart are described with reference to a system that performs the operations. This system may include one or more components of a client device such as a processor. Moreover, while operations of process 300 are shown in a particular order, this is not meant to be limiting. One or more operations may be reordered, omitted, and/or added.

At block 302, the system receives an episode of user interface input provided by a user of a client device. In many implementations, an episode is a sequence of actions with corresponding states that begin with an initial state and end with a terminal state. For example, an episode can include an initial state of a client device with no software clients open, an action to select a software client and a corresponding state of the client device once the action is completed, and a second action within the software client and a corresponding state of the client device once the second action is completed, where the state of the client device once the second action is completed is the terminal state (i.e., the state where the sequence of actions has reached the user's intent).

At block 304, the system generates updated holistic policy parameters for a holistic policy model using the episode of user interface input. For example, the system can determine the software client selected in the episode, and can update one or more parameters (such as weights) in the holistic policy model associated with selecting the corresponding software policy network.

At block 306, the system updates the holistic policy model using the updated holistic policy parameters.

At block 308, the system generates updated software policy parameters for a software policy model using the episode of user interface input. For example, at each action in the sequence of actions, the system can determine an intermediate reward for the corresponding action, and update one or more parameters of the software policy network based on each individual action. As a further example, the system can generate updated software policy parameters using the entire episode of user interface input.

At block 310, the system updates the software policy model using the updated software policy parameters.

Figure 4:
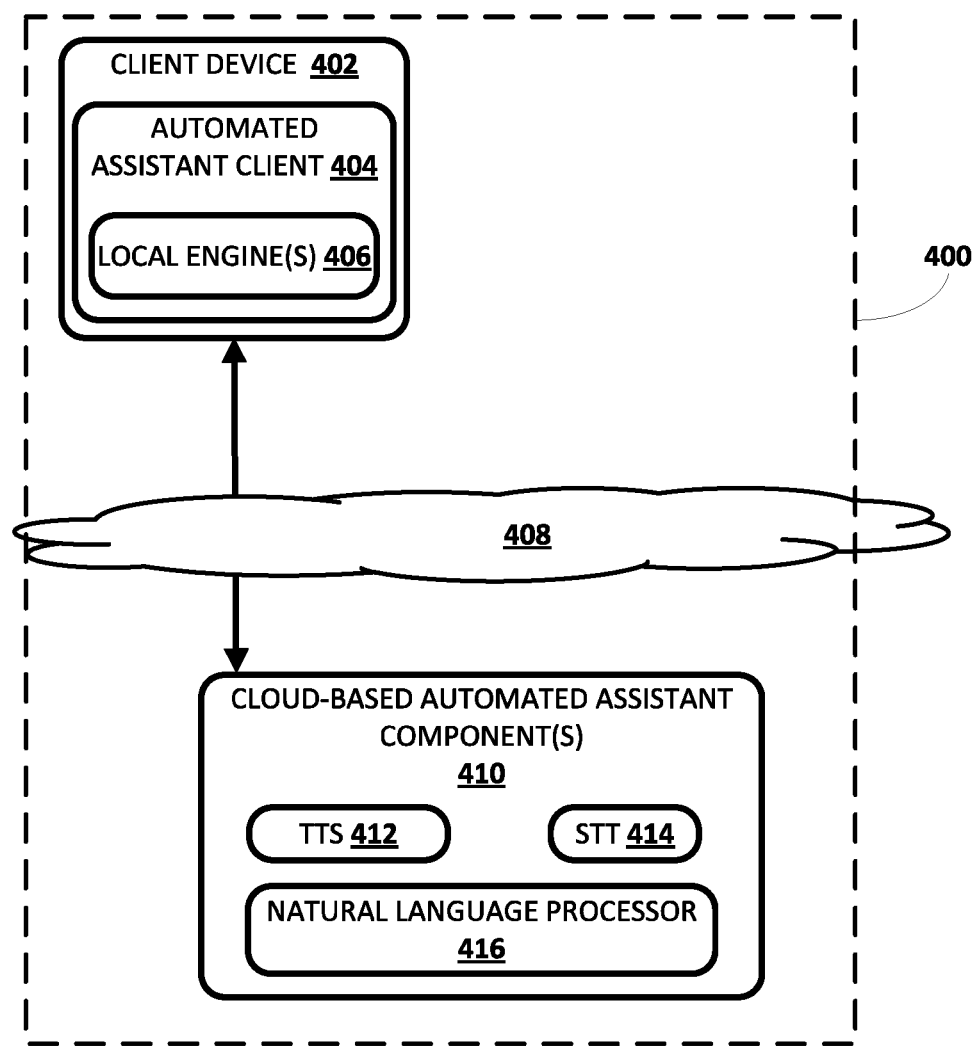
FIG. 4 illustrates an example environment in which various implementations disclosed herein can be implemented.

Turning now to FIG. 4, an example environment is illustrated where various implementations can be performed.

FIG. 4 includes a client computing device 402, which executes an instance of automated assistant client 404. One or more cloud-based automated assistant components 410 can be implemented on one or more computing systems (collectively referred to as cloud computing systems) that are communicatively coupled to client device 402 via one or more local and/or wide area networks (e.g., the Internet) indicated generally as 408.

An instance of an automated assistant client 404, by way of its interactions with one or more cloud-based automated assistant components 410, may form what appears to be, from the user's perspective, a logical instance of an automated assistant 400 with which the user may engage in a human-to-computer dialog. It should be understood that in some implementations, a user that engages with an automated assistant client 404 executing on client device 402 may, in effect, engage with his or her own logical instance of an automated assistant 400. For the sake of brevity and simplicity, the term "automated assistant" as used herein as "serving" a particular user will often refer to the combination of an automated assistant client 404 executing on a client device 402 operated by the user and one or more cloud-based automated assistant components 410 (which may be shared amongst multiple automated assistant clients of multiple client computing devices).

The client computing device 402 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided. In various implementations, the client computing device 402 may optionally operate one or more other applications that are in addition to automated assistant client 404, such as a message exchange client (e.g., SMS, MMS, online chat), a browser, and so forth. In some of those various implementations, one or more of the other applications can optionally interface (e.g., via an application program interface) with the automated assistant 400, or include their own instance of an automated assistant application (that may also interface with the cloud-based automated assistant component(s) 410).

Automated assistant 400 engages in human-to-computer dialog sessions with a user via user interface input and output devices of the client device 402. To preserve user privacy and/or conserve resources, in many situations a user must often explicitly invoke the automated assistant 400 before the automated assistant will fully process a spoken utterance. The explicit invocation of the automated assistant 400 can occur in response to certain user interface input received at the client device 402. For example, user interface inputs that can invoke the automated assistant 400 via the client device 402 can optionally include actuations of a hardware and/or virtual button of the client device 402. Moreover, the automated assistant client can include one or more local engines 406, such as an invocation engine that is operable to detect the presence of one or more spoken invocation phrases. The invocation engine can invoke the automated assistant 400 in response to detection of one of the spoke invocation phrases. For example, the invocation engine can invoke the automated assistant 400 in response to detecting a spoken invocation phrase such as "Hey Assistant", "OK Assistant", and/or "Assistant". The invocation engine can continuously process (e.g., if not in an inactive mode) a stream of audio data frames that are based on output from one or more microphones of the client device 402, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 400. As used herein, "invoking" the automated assistant 400 can include causing one or more previously inactive functions of the automated assistant 400 to be activated. For example, invoking the automated assistant 400 can include causing one or more local engines 406 and/or cloud-based automated assistant components 410 to further process audio data frames based on which the invocation phrase was detected, and/or one or more following audio data frames (whereas prior to invoking no further processing of audio data frames was occurring). For instance, local and/or cloud-based components can generate refined version of audio data and/or perform other processing in response to invocation of the automated assistant 400. In some implementations, the spoken invocation phrase can be processed to generate a speaker embedding that is used in generating a refined version of audio data that follows the spoken invocation phrase. In some implementations, the spoken invocation phrase can be processed to identify an account associated with a speaker of the spoken invocation phrase, and a stored speaker embedding associated with the account utilized in generating a refined version of audio data that follows the spoken invocation phrase.

The one or more local engine(s) 406 of automated assistant 400 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), a holistic agent engine (as described above), a software gent engine (as described above), and/or other local components. Because the client device 402 is relatively constrained in terms of computing resources (e.g., processor cycles, memory, battery, etc.), the local engines 406 may have limited functionality relative to any counterparts that are included in cloud-based automated assistant components 410.

Cloud-based automated assistant components 410 leverage the virtually limitless resources of the could to perform more robust and/or more accurate processing of audio data, and/or other user interface input, relative to any counterparts of the local engine(s) 406. Again, in various implementations, the client device 402 can provide audio data and/or other data to the cloud-based automated assistant components 410 in response to the invocation engine detecting a spoken invocation phrase, or detecting some other explicit invocation of the automated assistant 400.

The illustrated cloud-based automated assistant components 410 include a cloud-based TTS module 412, a cloud-based STT module 414, and a natural language processor 416. In some implementations, one or more of the engines and/or modules of automated assistant 400 may be omitted, combined, and/or implemented in a component that is separate from automated assistant 400. Further, in some implementations automated assistant 400 can include additional and/or alternative engines and/or modules.

Cloud based STT module 414 can convert audio data into text, which may then be provided to natural language processor 416. Cloud-based TTS module 412 can convert textual data (e.g., natural language responses formulated by automated assistant 400) into computer-generated speech output. In some implementations, TTS module 412 may provide the computer-generated speech output to client device 402 to be output directly, e.g., using one or more speakers. In other implementations, textual data (e.g., natural language responses) generated by cloud-based automated assistant component(s) 410 may be provided to one or the local engine(s) 406, which may then convert the textual data into computer-generated speech that is output locally.

Natural language processor 416 of automated assistant 400 processes free form natural language input and generates, based on the natural language input, annotated output for use by one or more other components of the automated assistant 400. For example, the natural language processor 426 can process natural language free-form input that is textual input that is a conversion, by STT module 414, of audio data provided by a user via client device 402. The generated annotated output may include one or more annotations of the natural language input and optional one or more (e.g., all) of the terms of the natural language input.

In some implementations, the natural language processor 416 is configured to identify and annotate various types of grammatical information in natural language input. In some implementations, the natural language processor 416 may additionally and/or alternatively include an entity tagger (not depicted) to configure to annotate entity references in one or more segments such as references to people (including, for instance, literary characters, celebrities, public figures, etc.), organizations, locations (real and imaginary), and so forth. In some implementations, the natural language processor 416 may additionally and/or alternatively include a coreference resolver (not depicted) configure to group, or cluster, references to the same entity based on one or more contextual cues. For example, the coreference resolver may be utilized to resolve the term "there" to "Hypothetical Café" in the natural language input "I liked Hypothetical Café last time we ate there". In some implementations, one or more components of the natural language processor 416 may rely on annotations from one or more other components of the natural language processor 416. In some implementations, in processing a particular natural language input, one or more components of the natural language processor 416 may use related prior input and/or other related data outside of the particular natural language input to determine one or more annotations.

In some implementations, cloud-based automated assistant components 410 can include a dialog state tracker (not depicted) that may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilized a fixed ontology that defines a set of slots and the set of values associated with those slots. Some techniques additionally or alternatively may be tailored to individual slots and/or domains. For example, some techniques may require training a model for each slot type in each domain.

Cloud-based automated assistant components 410 can include a dialog manager (not depicted) which may be configured to map a current dialog state, e.g., provided by a dialog state tracker, to one or more "responsive actions" of a plurality of candidate responsive actions that are then performed by automated assistant 400. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 100 outputting additional natural language dialog. This responsive dialog may include, for instance, requests that the user provide parameters for some action (i.e., fill slots) that a dialog state tracker believes the user intends to perform. In some implementations, responsive actions may include actions such as "requests" (e.g., seek parameters for slot filling), "offer" (e.g., suggest an action or course of action for the user), "select", "inform" (e.g., provide the user with requested information), "no match" (e.g., notify the user that the user's last input is not understood), a command to a peripheral device (e.g., to turn off a light bulb), and so forth.

In various implementations, automated assistant 400 can leverage the holistic multi-agent reinforcement learning techniques disclosed herein in acting upon various user inputs. For example, received input can be processed by the STT module 414, and the resulting text analyzed by the natural language processor 416 to determine one or more intents specified by the user input and optionally one or more values for slot(s) of the intents. Further, the automated assistant 400 can include, or interface with, a holistic agent engine and a software agent engine. The holistic agent engine can process the intent(s) and optionally the value(s), utilizing a holistic policy model, to select one or more software policy network(s) for satisfying the intent. Further, the software agent engine(s) can utilize the software policy network(s) to generate actions to control corresponding software client(s) based on the intent (and optionally the value(s)) and state data for the software client(s) during the controlling. The assistant 400 can render (e.g., visually and/or audibly) output that is based on content generated by the software client(s) responsive to being controlled in satisfying the intent.

Figure 5:
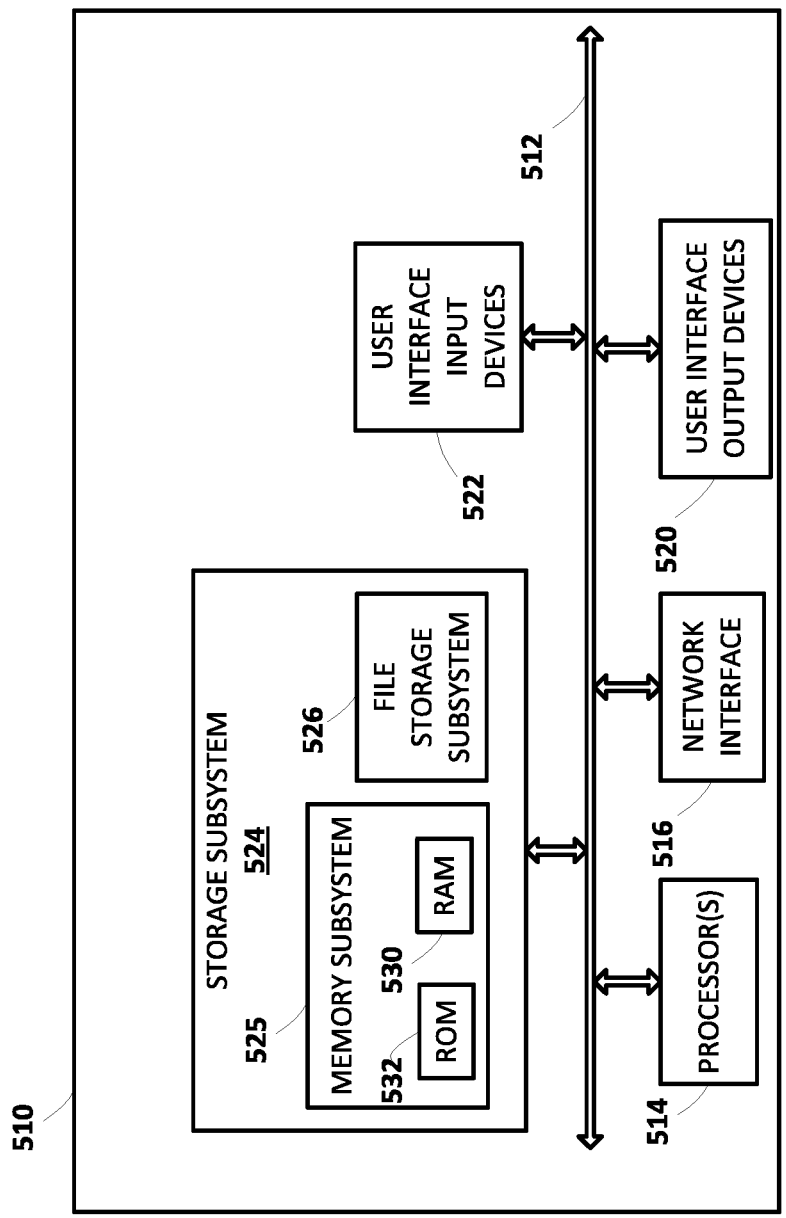
FIG. 5 illustrates an example architecture of a computing device.

FIG. 5 is a block diagram of an example computing device 510 that may optionally be utilized to perform one or more aspects of techniques described herein. In some implementations, one or more of a client computing device, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of one or more of the processes of FIG. 2 and/or FIG. 3, as well as to implement various components depicted in FIG. 1 and/or FIG. 4.

These software modules are generally executed by processor 514 alone or in combination with other processors. Memory 525 used in the storage subsystem 524 can include a number of memories including a main random access memory ("RAM") 530 for storage of instructions and data during program execution and a read only memory ("ROM") 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes receiving user interface input provided by a user of a client device via one or more user interface input devices of the client device. The method further includes selecting a particular software policy neural network from a plurality of candidate software policy neural networks, where selecting the particular policy neural network comprises selecting the particular policy neural network based on output generated by processing one or more features of the user interface input using a holistic policy neural network, where the holistic policy neural network represents a holistic reinforcement learning policy, where the one or more features of the user interface input include an intent identified based on analyzing the user interface input, and where the particular software policy neural network represents a reinforcement learning policy of a particular software client. The method further includes, in response to selecting the particular software policy neural network: using the particular software policy neural network in generating a sequence of particular actions and controlling the particular software client based on the sequence of particular actions. In some implementations, generating the sequence of particular actions includes: processing a sequence of state data for the particular software client and the intent using the particular software policy neural network, where the sequence of state data is based on states of the particular software client during controlling of the particular client based on the sequence of particular actions. The method further includes causing the client device to render output that is based on content generated by the particular software client responsive to controlling the particular software client based on the sequence of particular actions.

These and other implementations of the technology disclosed herein can include one or more of the following features.

In some implementations, the particular software policy neural network is used to generate outputs in an action space, where generating the sequence of particular actions includes: identifying available actions for given state data of the sequence of state data. The method further includes generating a given action in the sequence of particular actions based on processing the given state data and based on the identified available actions for the given state data. In some versions of those implementations, generating the sequence of particular actions further includes identifying the available actions using an accessibility application programming interface. In some versions of those implementations, the method further includes identifying portions of the action space that do not correspond to the available actions for the given state data. In some versions of those implementations, generating the given action based on processing the given state data and based on the identified available actions further includes: masking, in the action space, any portions of the action space that do not correspond to the available actions for the given state data, and selecting the given action from the portions of the action space that are not masked by the masking. In some versions of those implementations, generating the given action based on processing the given state data and based on the identified available actions processing the available actions further includes: processing the available actions, using the particular software policy neural network, along with the given of state data and the intent to constrain the action space to the available actions. In some versions of those implementations, the particular software policy neural network comprises a pointer network configured to determine a variable length output used in generating the given action.

In some implementations, the user interface input provided by the user of the client device comprises natural language input spoken by the user and directed at an automated assistant application.

In some implementations, the method further includes analyzing the user interface input to identify the intent and an additional intent, where the one or more features of the user interface input utilized in selecting the particular software policy neural network include the intent but do not include the additional intent. The method further includes selecting an additional software policy neural network, from the plurality of candidate software policy neural networks, by processing the additional intent using the holistic policy neural network, where the additional software policy neural network represents a reinforcement learning policy of an additional software client. The method further includes using the additional software policy neural network to generate an additional sequence of particular actions and controlling the additional software client based on the additional sequence of particular actions. Generating the additional sequence of particular actions includes: processing an additional sequence of state data for the additional software client and the additional intent using the additional software policy neural network, where the additional sequence of state data is based on additional states of the additional software client during controlling of the additional software client based on the additional sequence of particular actions, and causing the client device to render additional output that is based on additional content generated by the additional software client responsive to controlling the additional software client based on the additional sequence of actions. In some versions of those implementations, the additional software policy neural network is used to generate outputs in a further action space, where generating the additional sequence of actions includes: identifying available actions for given state data of the additional sequence of state data. In some versions of those implementations, the method further includes generating a given action in the additional sequence of actions based on processing the given state data of the additional sequence of state data and based on the identified available actions for the given state data of the additional sequence of state data. In some version of those implementations, generating the additional sequence of actions includes: identifying portions of the further action space that do not correspond to the available actions for the given state data of the additional sequence of state data. In some versions of those implementations, generating the given action in the additional sequence of actions based on processing the given state data of the additional sequence of state data and based on the identified available actions for the given state data of the additional sequence of state data includes: masking, in the further action space, any portions of the further action space that do not correspond to the available actions for the given state data of the additional sequence of state data. In some versions of those implementations, the method further includes selecting the given action in the additional sequence of actions from the portions of the further action space that are not masked by the masking. In some versions of those implementations, generating the given action in the additional sequence of actions based on processing the given state data of the additional sequence of state data and based on the identified available actions for the given state data of the additional sequence of state data includes: processing the available actions, using the additional software policy neural network, along with the given state data of the additional sequence of state data and the additional intent, to constrain the further action space to the available actions. In some versions of those implementations, the additional software policy neural network comprises a pointer network configured to determine a variable length output used in generating the given action in the additional sequence of actions.

In some implementations, the client device includes an automated assistant client and where the automated assistant client uses the software policy neural network in generating the sequence of particular actions and controlling the particular software client based on the sequence of particular actions. In some versions of those implementations, the received user interface input is spoken input by the user and includes an invocation phrase portion as well as an additional portion. In some versions of those implementations, the method further includes determining the additional portion of the user interface input. In some versions of those implementations, the method further includes analyzing the additional portion to identify the intent.

In some implementations, in response to causing the client device to render output that is based on the content generated by the particular software client responsive to being controlled based on the sequence of actions: the method further includes determining a holistic reward signal that provides an indication of the success of selecting the particular software policy neural network corresponding to the intent using the holistic policy neural network. In some versions of those implementations, the method further includes determining, using the holistic reward signal, updated holistic policy parameters for the holistic policy neural network. In some versions of those implementations, the method further includes updating the holistic policy neural network using the updated holistic policy parameters. In some versions of those implementations, the holistic reward signal is based on the content generated by the particular software client and/or is based on one or more further actions performed by the user subsequent to causing the client device to render the output that is based on the content generated by the particular software client.

In some implementations, in response to causing the client device to render output that is based on the content generated by the particular software client responsive to being controlled based on the sequence of actions, the method further includes determining a software reward signal which provides an indication of the success of generating the sequence of particular actions using the particular software policy neural network. In some versions of those implementations, the method further includes determining, using the software reward signal, updated software client policy parameters for the software policy neural network. In some versions of those implementations, the method further includes updating the software policy neural network using the updated software client policy parameters. In some versions of those implementations, the software reward signal is based on the content generated by the particular software client and/or is based on one or more further actions performed by the user subsequent to causing the client device to render the output that is based on the content generated by the particular software client.

In some implementations, processing the sequence of state data for the particular software client and the intent using the particular software policy neural network includes: determining the sequence of state data for the particular software client using an accessibility application programming interface.

In some implementations, the holistic policy neural network is a deep neural network, and where the software policy neural network is an additional deep neural network.

In some implementations, the holistic policy neural network is comprised at least in part in an operating system of the client device.

In some implementations, a method implemented by one or more processors is provided that includes receiving an episode of user interface input provided by a user of a client device via one or more user interface input devices of the client device, where the episode of user interface input includes a sequence of actions for a particular software client. The method further includes generating updated holistic policy parameters for a holistic policy neural network using the episode of user interface input, wherein the holistic policy neural network represents a reinforcement learning policy, where the updated holistic policy neural network is used to select a particular software policy neural network corresponding to the particular software client. The method further includes updating the holistic policy neural network using the updated holistic policy parameters. The method further includes generating updated software policy parameters for the software policy neural network using the episode of user interface input. The method further includes updating the software policy neural network using the updated software policy parameters.

These and other implementations of the technology disclosed herein can include one or more of the following features.

In some implementations, receiving the episode of user interface input provided by the user of the client device is in response to an automated assistant client of the client device determining it is unable to select a particular software policy neural network using the holistic policy neural network.

In some implementations, receiving the episode of user interface input provided by the user of the client device is in response to the an automated assistant client of the client device determining it is unable to generate a sequence of actions using the software policy neural network.

In some implementations, the episode of user interface input provided by the user of the client device includes a plurality of instances of user interface input, where each instance of user interface input includes a beginning client device state, a subsequent client device state transitioned to from the beginning client device state, and a user action to transition from the beginning client device state to the subsequent client device state.

What is claimed is:

1. A method implemented by one or more processors, comprising:
receiving user interface input provided by a user of a client device via one or more user interface input devices of the client device;
selecting a particular software policy neural network from a plurality of candidate software policy neural networks, wherein selecting the particular policy neural network comprises selecting the particular policy neural network based on output generated by processing one or more features of the user interface input using a holistic policy neural network,
wherein the holistic policy neural network represents a holistic reinforcement learning policy,
wherein the one or more features of the user interface input include an intent identified based on analyzing the user interface input, and
wherein the particular software policy neural network represents a reinforcement learning policy of a particular software client application corresponding to the intent of the user interface input;
in response to selecting the particular software policy neural network:
using the particular software policy neural network in generating the sequence of particular actions and controlling the particular software client application based on the sequence of particular actions,
wherein generating the sequence of particular actions comprises:
processing the sequence of state data for the particular software client application and the intent using the particular software policy neural network,
wherein the sequence of state data is based on states of the particular software client application during controlling of the particular client based on the sequence of particular actions;
identifying available actions for given state data of the sequence of state data;
identifying portions of the action space that do not correspond to the available actions for the given state data; and
generating a given action in the sequence of particular actions based on processing the given state data and based on the identified available actions for the given state data and the portions of the action space that do not correspond to the available actions for the given state data;
causing the client device to render output that is based on content generated by the particular software client application responsive to controlling the particular software client application based on the sequence of particular actions.

2. The method of claim 1, wherein generating the given action based on processing the given state data and based on the identified available actions comprises:
masking, in the action space, any portions of the action space that do not correspond to the available actions for the given state data; and
selecting the given action from the portions of the action space that are not masked by the masking.

3. The method of claim 1, wherein generating the given action based on processing the given state data and based on the identified available actions comprises:
processing the available actions, using the particular software policy neural network, along with the given state data and the intent to constrain the action space to the available actions.

4. The method of claim 3, wherein the particular software policy neural network comprises a pointer network configured to determine a variable length output used in generating the given action.

5. The method of claim 1, wherein the user interface input provided by the user of the client device comprises natural language input spoken by the user and directed at an automated assistant application.

6. The method of claim 1, further comprising:
analyzing the user interface input to identify the intent and an additional intent,
wherein the one or more features of the user interface input utilized in selecting the particular software policy neural network include the intent but do not include the additional intent;

selecting an additional software policy neural network, from the plurality of candidate software policy neural networks, by processing the additional intent using the holistic policy neural network,
   wherein the additional software policy neural network represents a reinforcement learning policy of an additional software client application, and using the additional software policy neural network to generate an additional sequence of particular actions and controlling the additional software client application based on the additional sequence of particular actions,
   wherein generating the additional sequence of particular actions comprises:
       processing an additional sequence of state data for the additional software client application and the additional intent using the additional software policy neural network,
       wherein the additional sequence of state data is based on additional states of the additional software client application during controlling of the additional software client application based on the additional sequence of particular actions; and causing the client device to render additional output that is based on additional content generated by the additional software client application responsive to controlling the additional software client application based on the additional sequence of actions.

7. The method of claim 6, wherein the additional software policy neural network is used to generate outputs in a further action space, wherein generating the additional sequence of actions comprises:
   identifying available actions for given state data of the additional sequence of state data;
   generating a given action in the additional sequence of actions based on processing the given state data of the additional sequence of state data and based on the identified available actions for the given state data of the additional sequence of state data.

8. The method of claim 7, wherein generating the additional sequence of actions comprises:
   identifying portions of the further action space that do not correspond to the available actions for the given state data of the additional sequence of state data.

9. The method of claim 7, wherein generating the given action in the additional sequence of actions based on processing the given state data of the additional sequence of state data and based on the identified available actions for the given state data of the additional sequence of state data comprises:
   masking, in the further action space, any portions of the further action space that do not correspond to the available actions for the given state data of the additional sequence of state data; and
   selecting the given action in the additional sequence of actions from the portions of the further action space that are not masked by the masking.

10. The method of claim 7, wherein generating the given action in the additional sequence of actions based on processing the given state data of the additional sequence of state data and based on the identified available actions for the given state data of the additional sequence of state data comprises:
   processing the available actions, using the additional software policy neural network, along with the given state data of the additional sequence of state data and the additional intent, to constrain the further action space to the available actions.

11. The method of claim 10, wherein the additional software policy neural network comprises a pointer network configured to determine a variable length output used in generating the given action in the additional sequence of actions.

12. The method of claim 1, wherein the client device includes an automated assistant client and wherein the automated assistant client uses the software policy neural network in generating the sequence of particular actions and controlling the particular software client based on the sequence of particular actions.

13. The method of claim 1, further comprising:
   in response to causing the client device to render output that is based on the content generated by the particular software client application responsive to being controlled based on the sequence of actions:
       determining a holistic reward signal that provides an indication of the success of selecting the particular software policy neural network corresponding to the intent using the holistic policy neural network.

14. The method of claim 13, further comprising:
   determining, using the holistic reward signal, updated holistic policy parameters for the holistic policy neural network; and
   updating the holistic policy neural network using the updated holistic policy parameters.

15. The method of claim 13, wherein the holistic reward signal is based on the content generated by the particular software client application and/or is based on one or more further actions performed by the user subsequent to causing the client device to render the output that is based on the content generated by the particular software client application.

16. The method of claim 1, further comprising:
   in response to causing the client device to render output that is based on the content generated by the particular software client application responsive to being controlled based on the sequence of actions,
       determining a software reward signal which provides an indication of the success of generating the sequence of particular actions using the particular software policy neural network.

17. The method of claim 16, further comprising:
   determining, using the software reward signal, updated software client application policy parameters for the software policy neural network; and
   updating the software policy neural network using the updated software client application policy parameters.

18. The method of claim 1, wherein processing the sequence of state data for the particular software client application and the intent using the particular software policy neural network comprises:
   determining the sequence of state data for the particular software client application using an accessibility application programming interface.

* * * * *